(12) United States Patent
Kim et al.

(10) Patent No.: US 7,474,941 B2
(45) Date of Patent: Jan. 6, 2009

(54) ROBOT CLEANER

(75) Inventors: Ki-man Kim, Gwangju (KR); Ii-du Jung, Gwangju (KR)

(73) Assignee: Samsung Gwangju Electronics Co., Ltd. (KR)

( * ) Notice: Subject to any disclaimer, the term of this patent is extended or adjusted under 35 U.S.C. 154(b) by 758 days.

(21) Appl. No.: 10/887,930

(22) Filed: Jul. 12, 2004

(65) Prior Publication Data

US 2005/0021181 A1 Jan. 27, 2005

(30) Foreign Application Priority Data

Jul. 24, 2003 (KR) .................. 10-2003-0050904
May 17, 2004 (KR) .................. 10-2004-0034647

(51) Int. Cl.
*G06F 19/00* (2006.01)
*A47L 11/00* (2006.01)
(52) U.S. Cl. ............. 700/258; 700/245; 700/246; 318/568.16; 15/319; 901/46
(58) Field of Classification Search ... 296/26.08–26.09, 296/26.11–26.13, 26.15, 186.4, 186.3, 186.9, 296/186.13, 1.04; 446/486.489; 700/246, 700/258; 701/24, 25
See application file for complete search history.

(56) References Cited

U.S. PATENT DOCUMENTS

| | | | | | |
|---|---|---|---|---|---|
| 1,625,505 | A | * | 4/1927 | Stump et al. | 200/61.44 |
| 3,834,483 | A | * | 9/1974 | Palmer | 180/271 |
| 5,248,274 | A | * | 9/1993 | Wang | 446/6 |
| 5,697,829 | A | * | 12/1997 | Chainani et al. | 446/436 |
| 6,580,246 | B2 | * | 6/2003 | Jacobs | 318/568.16 |
| 6,748,297 | B2 | * | 6/2004 | Song et al. | 700/259 |
| 6,809,490 | B2 | * | 10/2004 | Jones et al. | 318/568.12 |
| 6,883,201 | B2 | * | 4/2005 | Jones et al. | 15/319 |
| 7,167,775 | B2 | * | 1/2007 | Abramson et al. | 700/245 |
| 2002/0124343 | A1 | | 9/2002 | Reed | |
| 2003/0060928 | A1 | * | 3/2003 | Abramson et al. | 700/245 |
| 2004/0088081 | A1 | * | 5/2004 | Song et al. | 700/259 |

(Continued)

FOREIGN PATENT DOCUMENTS

JP 60-92158 5/1985

(Continued)

OTHER PUBLICATIONS

EFC Panel Fasteners Engineering Guide, http://web.archive.org/web/20040708185114/http://www.efc-panelfasteners.com/products.*

(Continued)

*Primary Examiner*—Thomas G Black
*Assistant Examiner*—Lin B Olsen
(74) *Attorney, Agent, or Firm*—Blank Rome LLP

(57) ABSTRACT

A robot cleaner is provided. The robot cleaner comprises a bumper to buffer a shock caused by a sudden collision with an unexpected obstacle and an unexpected obstacle detecting means and a controller to change a running direction of the robot cleaner to avoid the obstacle. Accordingly, when an unexpected obstacle appears in front of the cleaner and the cleaner collides with the obstacle, the bumper buffers and absorbs the shock, thereby preventing damage to a cleaner body and inner parts. Also, the robot cleaner can avoid the obstacle and, thus, complete a cleaning operation without stopping the cleaning operation.

8 Claims, 8 Drawing Sheets

U.S. PATENT DOCUMENTS

| | | | |
|---|---|---|---|
| 2004/0158357 A1* | 8/2004 | Lee et al. | 700/258 |
| 2004/0236468 A1* | 11/2004 | Taylor et al. | 700/245 |
| 2005/0165508 A1* | 7/2005 | Kanda et al. | 700/245 |
| 2005/0217061 A1* | 10/2005 | Reindle | 15/319 |
| 2006/0136096 A1* | 6/2006 | Chiappetta et al. | 700/245 |
| 2007/0142964 A1* | 6/2007 | Abramson | 700/245 |

FOREIGN PATENT DOCUMENTS

| | | | |
|---|---|---|---|
| JP | 04-096720 | | 3/1992 |
| JP | 06-189877 | | 7/1994 |
| JP | 06189877 A | * | 7/1994 |
| JP | 2003-050632 | | 2/2003 |
| NL | 1022340 C | | 2/2004 |
| WO | WO 02/067745 | | 9/2002 |
| WO | WO 02/067745 A1 | | 9/2002 |
| WO | WO 02/071175 | | 9/2002 |
| WO | WO 02/071175 A1 | | 9/2002 |

OTHER PUBLICATIONS

Chinese Patent Office, Office Action dated Jan. 6, 2006 with respect to corresponding Application No. 200410063352.8.

Swedish Patent Office, Office Action issued Mar. 16, 2005 in connection with corresponding application No. 0401761-2.

Dutch Patent Office Novelty Search Report issued Mar. 14, 2005 in connection with Application No. 1026697.

Korean Intellectual Property Office, Official Action issued Dec. 6, 2005, with respect to Korean Patent Application No. 2004-34647 filed on May 17, 2004.

Japanese Patent Office, Japanese Office Action issued Feb. 20, 2007 with respect to Japanese Patent Application No. 2004-200842 filed on Jul. 7, 2004.

* cited by examiner

ROBOT CLEANER

CROSS-REFERENCE TO RELATED APPLICATIONS

This application claims the benefit of Korean Patent Application Nos. 2003-50904, filed Jul. 24, 2003, and 2004-34647, filed May 17, 2004, in the Korean Intellectual Property Office, the disclosures of which are incorporated herein by reference.

BACKGROUND OF THE INVENTION

1. Field of the Invention

The present invention relates to a robot cleaner.

2. Description of the Related Art

As is well known, a robot cleaner automatically cleans an area by sucking dust and contaminants from a cleaning surface while automatically running around the area without requiring a user's intervention.

One example of such a robot cleaner is illustrated in FIGS. 1 and 2, which will be described briefly below.

FIG. 1 is a perspective view showing a general robot cleaner, with its cover omitted, and FIG. 2 is a bottom view of FIG. 1. Reference numerals indicate elements as follows: robot body 10, dust suction element 20, suction opening 30, sensing element 40, controller 50, and battery 60.

As shown in FIG. 1, a plurality of driving wheels 11, 12 are disposed at both sides of the robot body 10. The robot body 10 is approximately circular in shape, and is provided with a cylindrical cover (not shown).

The dust suction element 20 sucks dust from a surface to be cleaned by using a strong suction force generated at a suction port (not shown) formed in the robot body 10. The dust suction element 20 includes a vacuum motor (not shown) and a dust-collecting chamber (also not shown) for collecting dust drawn in through the suction port by the operation of the vacuum motor.

The suction opening 30 is formed in a side of the bottom of the robot body 10 (FIG. 2) in fluid communication with the suction port (not shown) and has a rotary brush 31 disposed therein for brushing up dust.

The sensing element 40 is arranged along a circumference of the robot body 10 at a predetermined interval to transmit signals to the outside and receive reflected signals. The sensing element 40 includes an obstacle sensor (not shown) and a running distance sensor (not shown).

The controller 50 processes signals received through a transceiver (not shown) and controls the respective parts accordingly. The controller 50 drives the driving wheels 11, 12 in response to the signals from an external control device (not shown) or a remote controller (not shown), and also drives the vacuum motor (not shown) of the dust suction element 20. The controller 50 also controls the operation of the robot cleaner based on the signals received from the sensing element 40.

A robot cleaner with the above-mentioned structure can determine through the sensing part 40 a distance to an obstacle in a cleaning area, such as furniture, office appliances and walls, and selectively drive the driving wheels 11, 12 of the robot body 10, thus automatically changing the running direction of the robot cleaner.

However, the obstacle sensor of the related art robot cleaner cannot detect all obstacles, and, if an unexpected obstacle lies in front of the robot cleaner, the robot cleaner may not respond appropriately. Therefore, a sudden collision with the obstacle causes damages to the cleaner body and other parts.

Also, the related art robot cleaner does not have a function or structure to protect the robot body from a shock due to the sudden collision with the obstacle and to avoid the obstacle. Therefore, a user feels inconvenience, and cleaning efficiency deteriorates.

SUMMARY OF THE INVENTION

The present invention has been developed in order to solve the problems in the related art. Accordingly, it is an aspect of the present invention to provide a robot cleaner which can buffer a shock caused by a sudden collision with an unexpected obstacle and prevent damage to the robot cleaner, and avoids the obstacle to continue the cleaning operation.

The above aspect is achieved by providing a robot cleaner which removes a dirt from a cleaning surface while automatically running along a predetermined path. According to one embodiment, the robot cleaner comprises a cleaner body having a driving part to drive the robot cleaner and a suction part to remove the dirt; a bumper attached to the cleaner body for protecting the cleaner body from a shock caused by a collision with an obstacle during the running operation, a bumper supporting unit for elastically supporting the bumper so that the bumper moves between a first position where the bumper is separated from the cleaner body by a predetermined distance and a second position where the bumper retreats from the first position, an unexpected obstacle sensing means switched on/off according to the displacement of the bumper and for detecting the appearance of an unexpected obstacle, and a controller for controlling the driving part and the suction part, determining the appearance of the obstacle in response to a signal from the unexpected sensing means, and changing a running direction of the cleaner body to avoid the obstacle.

The bumper supporting unit may comprise a pair of flanges formed on opposite inner sides of the bumper, each having a slide hole, a pair of connectors each having a pin formed at one end to be inserted into the slide hole of the flange, and a pair of fixing pieces formed on the cleaner body, for fixing the other ends of the connectors.

The unexpected obstacle sensing means may comprise micro switches disposed at opposite sides of the cleaner body, each having a switch portion, and a plate spring disposed at the cleaner body adjacent to the micro switch, for switching on/off the micro switch, the plate elastically biased in normal condition to switch off the switch portion, the plate spring elastically deformed when the bumper is displaced to the second position so that the switch portion is switched on. The controller determines that an unexpected obstacle lies in front of the robot cleaner when the switching part is switched on.

The robot cleaner may further comprise a buffering unit for elastically supporting the bumper with respect to the cleaner body to maintain the bumper at the first position, and absorbing the shock to the bumper.

The buffering unit may comprise a first member protruding from the inner side of the bumper toward the cleaner body, and having at least one pair of guide recesses opposing to each other, a second member movably disposed in the first member, and having a pair of protrusions formed at one end to be inserted into the guide recesses of the first member, the other end of the second member contacting the cleaner body, and an elastic member disposed in the second member for biasing the second member outwardly.

According to another embodiment of the present invention, the buffer supporting unit comprises a first supporting member protruding from the inner side of the bumper toward the cleaner body, and having at least one pair of guide recesses opposing to each other, a second supporting member movably disposed in the first supporting member, and having a pair of protrusions formed at one end to be inserted in the guide recesses, a third supporting member protruding from the other end of the second supporting member and having a hook formed at one end, and a fourth supporting member having a hook hole formed in one side of the cleaner body to receive the third supporting member.

A fifth supporting member is formed at the other end of the second supporting member and has a front end contacting the fourth supporting member to support the third supporting member inserted into the hook hole at a constant position.

According to another embodiment, the unexpected obstacle sensing means comprises micro switches disposed at opposite sides of the cleaner body, and each having a switch portion, and a plate spring disposed at the cleaner body adjacent to the micro switch to switch on/off the micro switch, the plate spring elastically biased in normal condition to switch off the switch portion, the plate spring elastically deformed when the bumper is displaced to the second position so that the switch portion is switched on. The controller determines that an unexpected obstacle lies in front of the robot cleaner when the switch portion is switched on. The bumper is elastically supported at the first position by the plate spring.

BRIEF DESCRIPTION OF THE DRAWINGS

The above aspect and other advantages of the present invention will be more apparent by describing preferred embodiments of the present invention with reference to the accompanying drawings, in which.

DETAILED DESCRIPTION OF THE EXEMPLARY EMBODIMENTS

Figure 1:
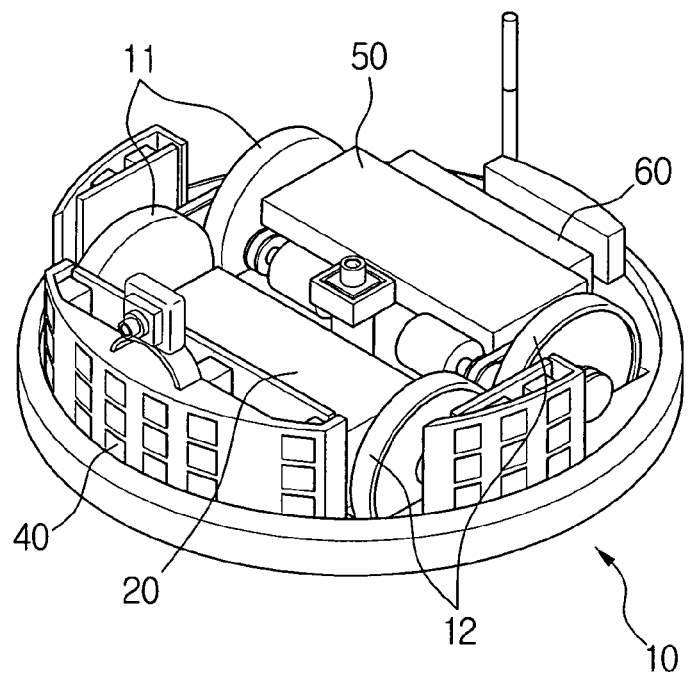
FIG. 1 is a drawing showing a perspective view of a general robot cleaner.
Figure 2:
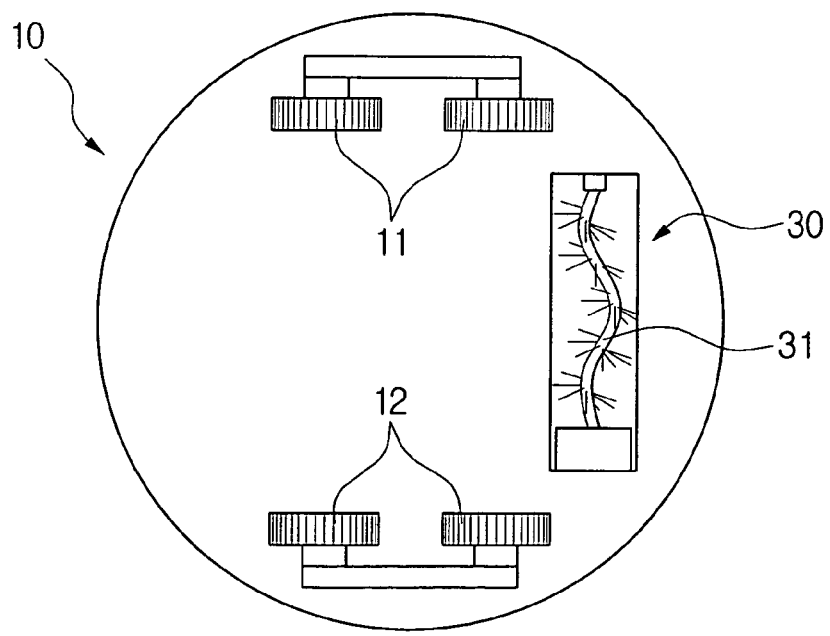
FIG. 2 is a drawing of a bottom view of FIG. 1.
Figure 3:
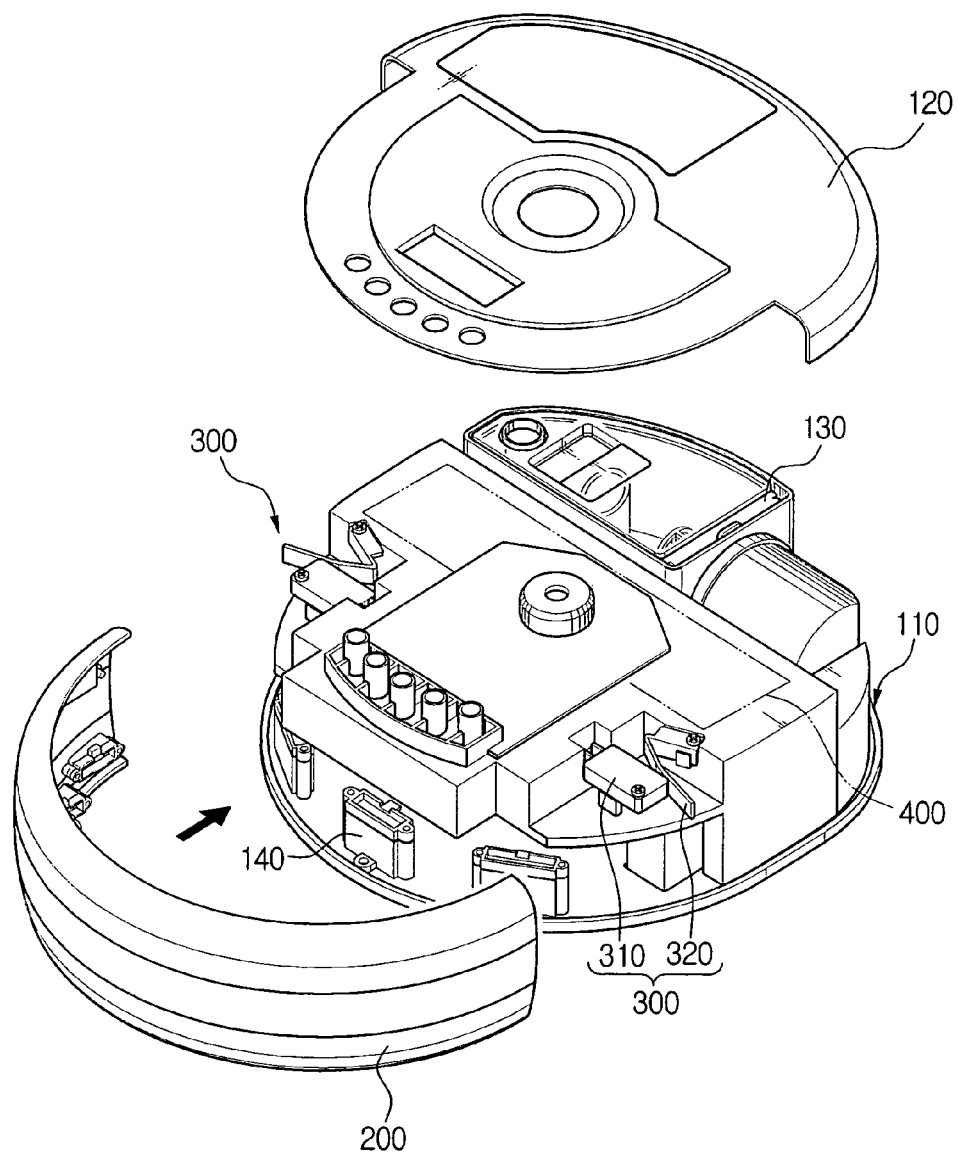
FIG. 3 is a drawing of an exploded perspective view showing a robot cleaner according to one embodiment of the present invention.
Figure 4A:
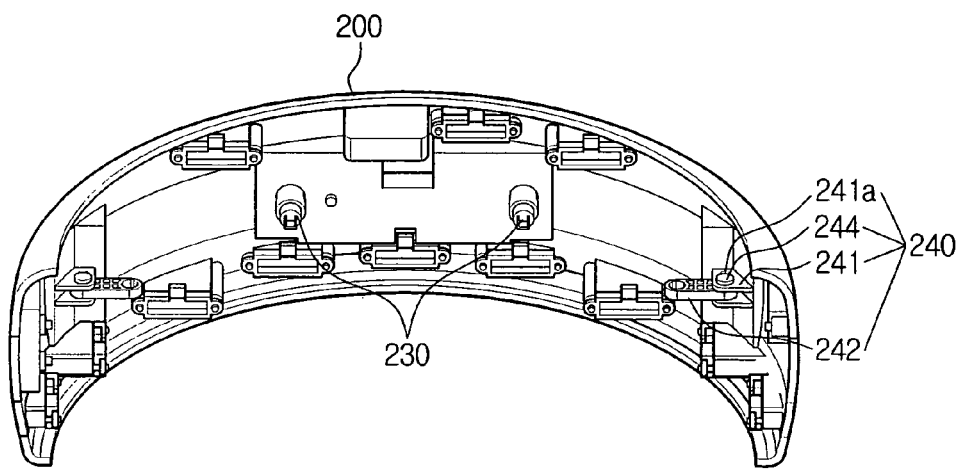
FIGS. 4A and 4B are drawings showing a perspective view of an interior of the bumper of the robot cleaner according to one embodiment of the present invention.
Figure 4B:
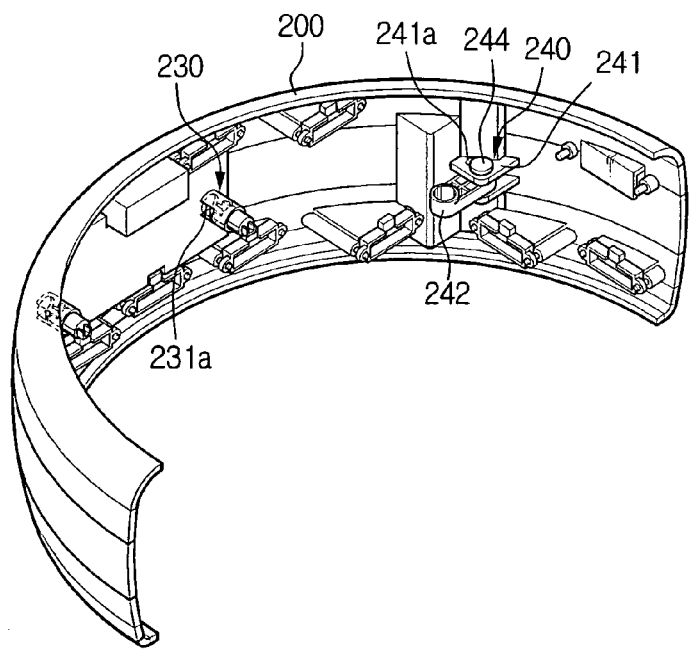
Figure 5:
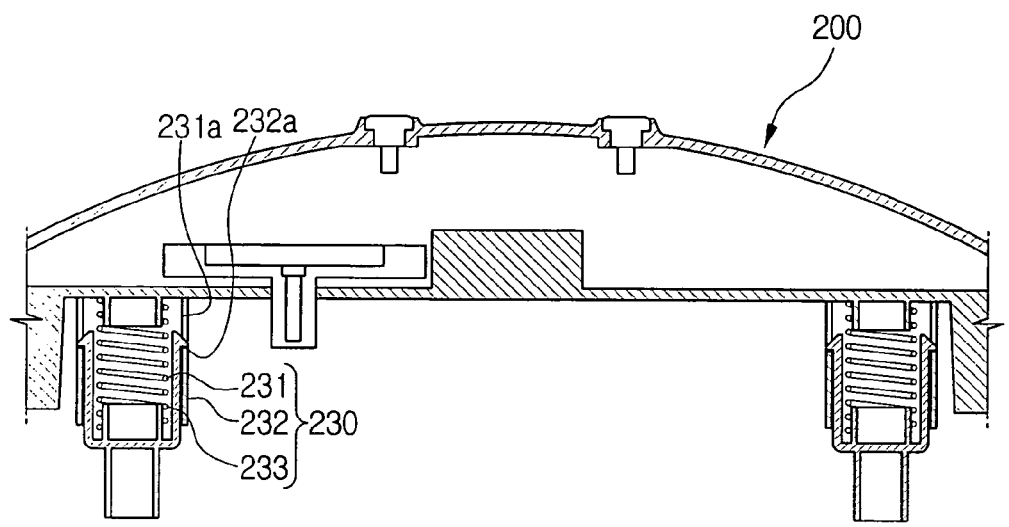
FIG. 5 is a drawing of a cross sectional view showing the bumper supporting unit of the robot cleaner according to one embodiment of the present invention.
Figure 6:
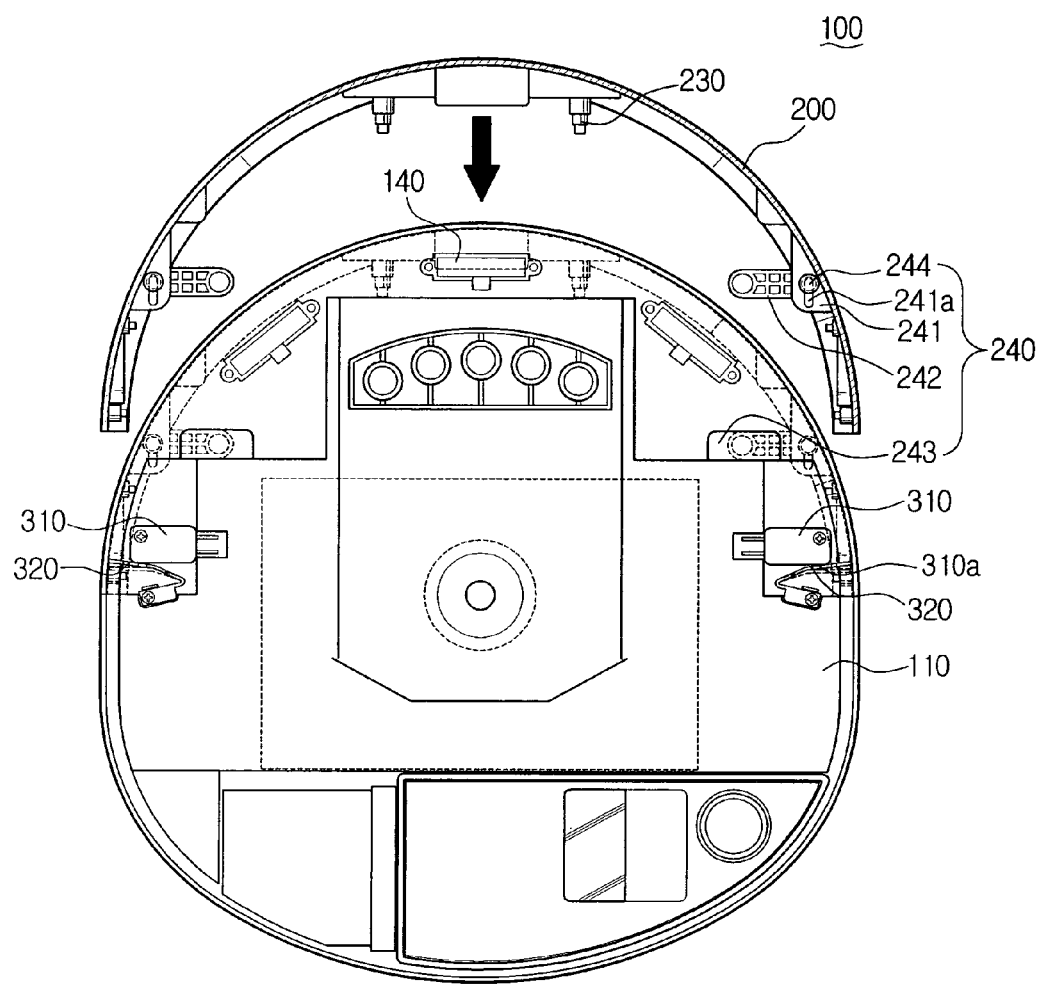
FIG. 6 is a drawing showing the bumper of the robot cleaner and the cleaner body in an assembled state according to one embodiment of the present invention.
Figure 7:
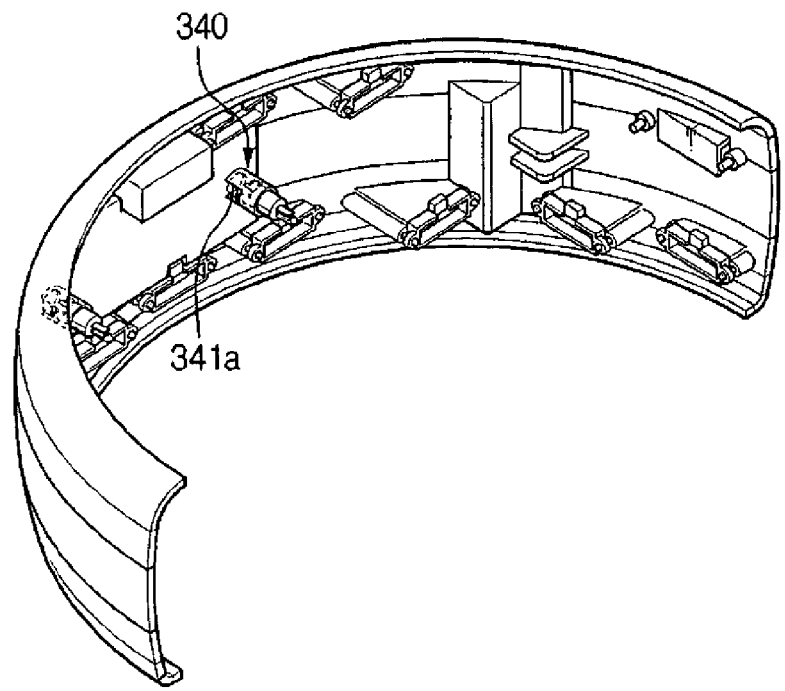
FIG. 7 is a drawing of a perspective view showing an interior of a bumper of a robot cleaner according another embodiment of the present invention.

Hereinafter, a robot cleaner according to embodiments of the present invention will be described in detail, with reference to the accompanying drawings.

FIGS. 3 to 6 are drawings showing a robot cleaner according to one embodiment of the present invention. As shown in FIGS. 3-6, a robot cleaner has a cleaner body 110, a cover 120, a bumper 200, a buffering unit 230, a bumper supporting unit 240, and unexpected obstacle sensing means 300, and a controller 400.

The cleaner body 110 is provided with a driving part (not shown) to run the robot cleaner, a dust suction part 130 for collecting dust, a suction opening (not shown), a sensing part 140, and a battery (not shown). The controller 400, which will be described in detail below, is also disposed in the cleaner body 110. The above structure is similar to that of a general robot cleaner, and thus detailed descriptions are omitted. Hereinbelow, distinguishable features of the present invention will be described.

The bumper 200 is attached to the cleaner body 110 for the purpose of mitigating a shock caused by a sudden collision with an unexpected obstacle, and thus prevents damages to the cleaner body 110. The bumper 200 is designed to cover a front surface and a partial side surface of the cleaner body 110. For example, if the cleaner body 110 is circular in shape, the bumper 200 has a substantially semicircular ring shape. Although it is preferred that the bumper 200 is made of plastic, which is robust to a shock, this should not be considered as limiting.

Due to the presence of the bumper 200, which is capable of mitigating the shock caused by the sudden collision with the unexpected obstacle, the cleaner body 110 can be protected from shock.

The bumper 200 is moved by the bumper supporting unit 240 between a first position at which the bumper 200 is separated from the cleaner body 110 by a predetermined distance and a second position at which the bumper 200 retreats from the first position. The bumper 200 is displaced from the first position to the second position when the robot cleaner collides with the obstacle, thereby effectively absorbing the shock to the cleaner body 110.

As shown in FIGS. 4A to 6, the bumper supporting unit 240 comprises a flange 241 formed on the bumper 200, a connector 242, and a fixing piece 243 formed on the cleaner body 110.

The flanges 241 are disposed at both sides of the bumper 200, and each flange 241 has a slide hole 241a formed therein. The flange 241 may be formed integrally with the bumper 200.

The connector 242 has one end inserted into the slide hole 241a by a pin 244 and the other end fixed to the fixing piece 243. The fixing pieces 243 are disposed on the both sides of the cleaner body 110 corresponding to the flanges 241.

The bumper 200 is moved between the first and the second positions within a predetermined stroke, which corresponds to a length of the slide hole 241a.

The buffering unit 230 elastically supports the bumper 200 with respect to the cleaner body 110 to maintain the bumper 200 at the first position, and also absorbs the shock to the bumper 200. The buffering unit 230 comprises a first member 231, a second member 232, and an elastic member 233.

The first member 231 is shaped in a cylinder protruding from the inner side of the bumper 200 toward the cleaner body 110, and is provided with at least one pair of guide recesses 231a opposing to each other.

The second member 232 is also shaped in a cylinder so that it is movably disposed in the first member 231, and is provided with a pair of protrusions 232a formed at one end thereof to be inserted into the guide recesses 231a. The other end of the second member 232 contacts the cleaner body 110.

The elastic member 233 is disposed in the second member 232 to elastically bias the second member 232 outwardly from the first member 231.

The unexpected obstacle sensing means 300 is switched on and off in relation to the displacement of the bumper 200, and detects the appearance of the unexpected obstacle. The unexpected obstacle sensing means 300 are disposed at positions where the opposite ends of the bumper 200 are located, and comprises a micro switch 310 having a switch portion 310a, and a plate spring 320 switching on and off the switch portion 310a of the micro switch 310 according to the displacement of the bumper 200.

The micro switch 310 uses a generally well-known switch. The plate spring 320 is disposed at an appropriate position of the cleaner body 110 adjacent to the micro switch 310, and is elastically biased to switch off the switch portion 310a. When the bumper 200 is displaced to the second position, the plate spring 320 is depressed by the end of the bumper 200 and elastically deformed, thus switching on the switch portion 310a.

When the micro switch 310 is switched on, the controller 400 determines in response to a signal from the micro switch 310 that the robot cleaner collides with an unexpected obstacle, and properly responds to it, for example, temporarily changes a running direction to avoid the obstacle. If it is determined that the obstacle is avoided, the robot cleaner returns to its originally set running path to continue the cleaning operation.

As described above, the bumper 200 of the robot cleaner according to one embodiment of the present invention absorbs and buffers the shock caused by the collision with the unexpected obstacle, thereby preventing the damages to the cleaner body 110 and other parts. Also, the robot cleaner avoids the obstacle to continue its running along the initially set path without stopping the cleaning operation.

Hereinbelow, the operation of the robot cleaner with the above construction will be described in detail.

The robot cleaner performs a cleaning while running along a predetermined path within an initially set cleaning area. If an obstacle or a wall appears in front of the robot cleaner, the sensing part 140 detects to avoid the obstacle.

However, in case of an unexpected obstacle, the sensing part 140 may not detect it and thus collides with the obstacle. In this case, the bumper 200 protects the robot cleaner from a shock caused by a sudden collision with the unexpected obstacle.

More specifically, when the robot cleaner cannot avoid the unexpected obstacle and collides with it, the bumper 200 is displaced from the first position to the second position, thereby absorbing and buffering the shock and preventing the shock from being transferred to the cleaner body 110 directly. Therefore, the robot cleaner and other inner parts can be protected from the shock.

When the bumper 200 is pushed backwardly by the shock and thus displaced from the first position to the second position, the plate spring 320 is deformed from a position where the switch portion 310a is in contact with the place spring 320, thereby switching on the micro switch 310. Then, the controller 400 determines that the robot cleaner collides with an unexpected obstacle, and controls the driving part to rotate in a reverse direction. The robot cleaner departs from the location of the obstacle.

FIGS. 7 to 10 are drawings showing a robot cleaner according to another embodiment of the present invention. The basic structure of the robot cleaner according to another embodiment is similar to that of the foregoing embodiment. Therefore, like reference numerals refer to like features and structures.

The robot cleaner according to another embodiment of the present invention is different from that of the foregoing embodiment in a structure of a bumper supporting unit 340 for movably supporting a cleaner body 110 between a first position and a second position.

More specifically, the bumper supporting unit 340 according to another embodiment has a modified buffering unit instead of the buffering unit 230 of the foregoing embodiment. In this embodiment, the plate spring 320 of the unexpected obstacle sensing means 300 acts as the buffering unit 230. The elasticity of the plate spring 320 is sufficient to elastically support the bumper 200 at the first position. Thus, the structure of the bumper supporting unit 240 of the foregoing embodiment is omitted in this embodiment.

Figure 8:
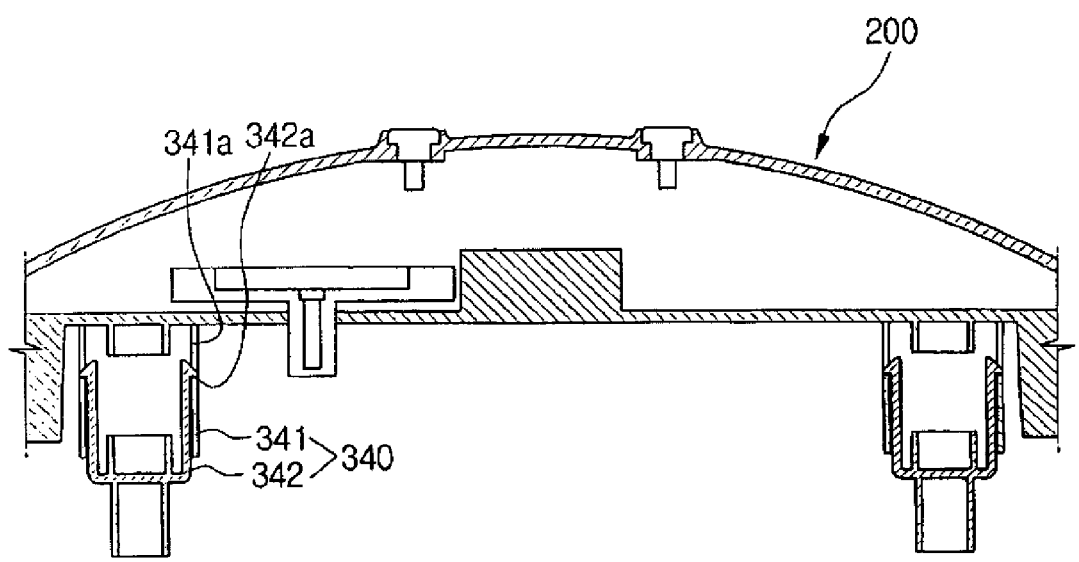
FIG. 8 is a drawing of a cross sectional view showing the bumper supporting unit of the robot cleaner according to another embodiment of the present invention.
Figure 9A:
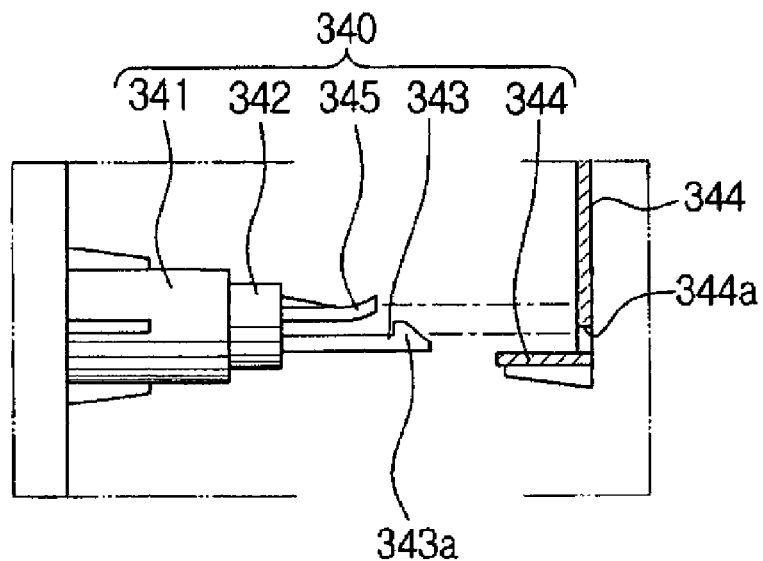
FIGS. 9A and 9B are drawings showing the bumper supporting unit and the robot cleaner in a disassembled state and an assembled state.
Figure 9B:
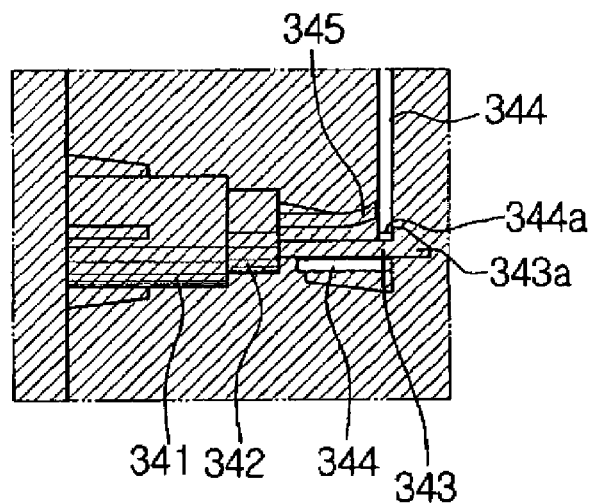
Figure 10:
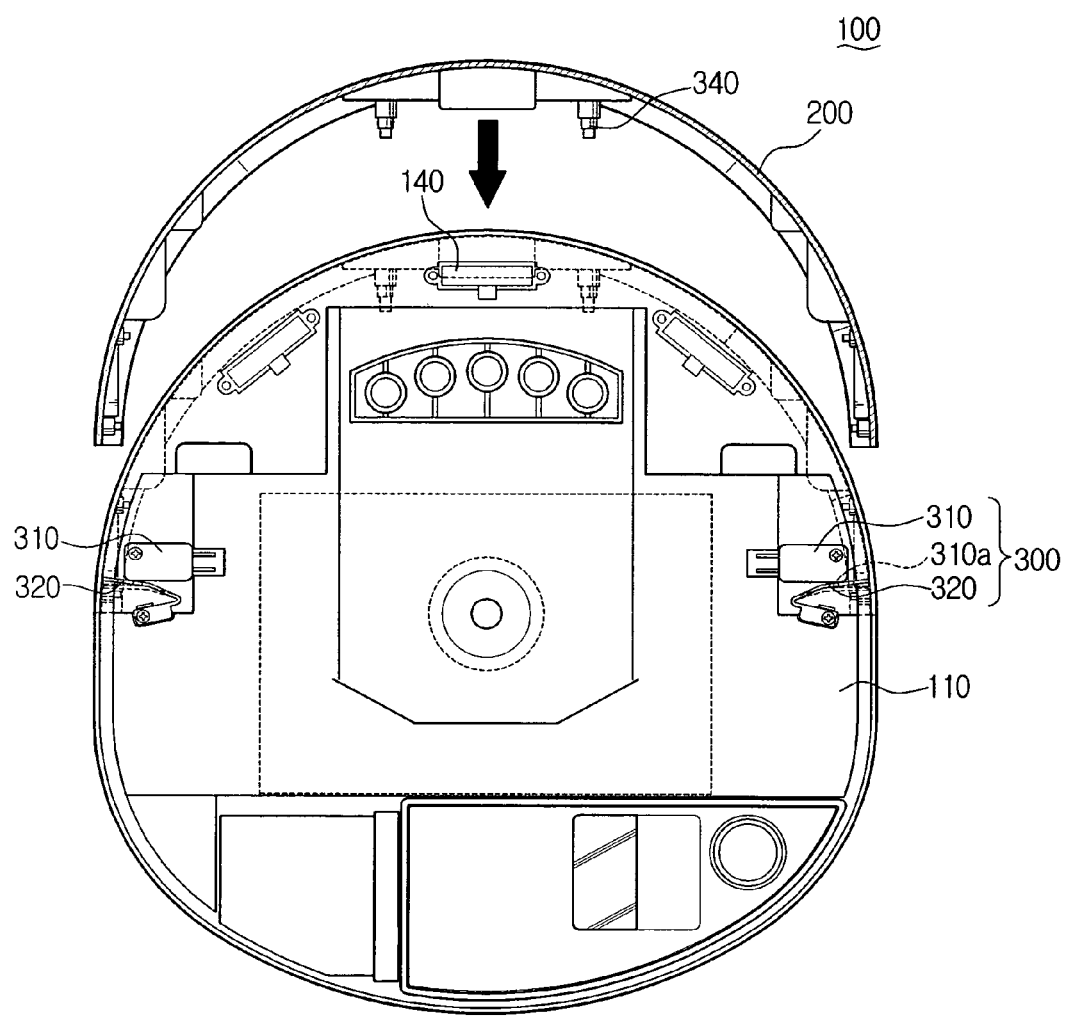
FIG. 10 is a drawing showing the bumper and the cleaner body in an assembled state according to another embodiment of the present invention.

As shown in FIGS. 8 to 9B, the bumper supporting unit 340 comprises a first supporting member 341, a second supporting member 342, a third supporting member 343, a fourth supporting member 344, and a fifth supporting member 345.

The first supporting member 341 protrudes from the inner side of the bumper 200 toward the cleaner body 110, and has at least one pair of guide recesses 341a opposing to each other. The first supporting member 341 is substantially cylindrical in shape, and formed integrally with the bumper 200.

The second supporting member 342 is movably disposed in the first supporting member 341, and has protrusions 342a inserted into the guide recesses 341a. The second supporting member 342 is also substantially cylindrical in shape.

The third supporting member 343 protrudes from one end of the second supporting member 342, and has a hook 343a formed at one end thereof.

The fourth supporting member 344 is formed on one end of the cleaner body 110 to connect with the third supporting member 343, and has a hook hole 344a into which the hook 343a of the third supporting member 343 is hooked.

The fifth supporting member 345 is formed at one end of the second supporting member 342 in parallel relation to the third supporting member 343, and has a length smaller than that of the third supporting member 343. When the bumper 200 is assembled with the cleaner body 110, the third supporting member 343 is inserted into the hook hole 344a of the fourth supporting member 344, while the fifth supporting member 345 just contacts the fourth supporting member 344. Accordingly, the third supporting member 343 inserted into the hook hole 344a is maintained at a constant position.

Other parts and operation of the robot cleaner according to another embodiment of the present invention are the same as in the foregoing embodiment. Therefore, detailed descriptions are omitted.

As described above, since the robot cleaner according to the present invention has the bumper 200 for buffering the shock, it can be protected from the shock caused by the sudden collision with the unexpected obstacle.

Also, when the robot cleaner collides head-on with an obstacle, the bumper 200 is displaced from the first position to the second position to thus actuate the micro switch, so that the robot cleaner can detect the appearance of the obstacle, and change its running direction to avoid the obstacle.

Accordingly, the robot cleaner continues the cleaning operation without stopping it, and thus increases the cleaning efficiency.

The foregoing embodiments and advantages are merely exemplary and are not to be construed as limiting the present invention. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A robot cleaner that removes dirt from a cleaning surface while automatically running along a predetermined path, the robot cleaner comprising:
   a cleaner body having a driving part to drive the robot cleaner and a suction part to remove dirt;
   a bumper attached to the cleaner body for protecting the cleaner body from a shock caused by a collision with an unexpected obstacle during the running operation;
   a bumper supporting unit for elastically supporting the bumper so that the bumper moves between a first position where the bumper is separated from the cleaner body by a predetermined distance and a second position where the bumper retreats from the first position;
   a plurality of micro switches disposed at opposite sides of the cleaner body for detecting the collision with the unexpected obstacle, each micro switch including,
   at least one switch portion disposed at the cleaner body, and
   at least one plate spring disposed adjacent to the at least one switch portion for switching on/off the switch portion, the plate spring elastically supporting the bumper in the first position and being biased to switch off the switch portion when the bumper is in the first position and elastically deformed to switch on the switch portion when the bumper is displaced to the second position,
   wherein the switch portion is switched on when the switch portion contacts the at least one plate spring and the switch portion is switched off when the switch portion is spaced from the at least one spring plate; and
   a controller for controlling the driving part and the suction part,
   wherein the controller determines that an unexpected obstacle lies in front of the robot cleaner when the at least one switch portion is switched on, the controller thereby changing the predetermined path of the cleaner body to avoid the unexpected obstacle.

2. A robot cleaner which removes dirt from a cleaning surface while automatically running along a predetermined path, the robot cleaner comprising:
   a cleaner body having a driving part to drive the robot cleaner and a suction part to remove dirt;
   a bumper attached to the cleaner body for protecting the cleaner body from a shock caused by a collision with an unexpected obstacle during the running operation;
   a bumper supporting unit for elastically supporting the bumper so that the bumper moves between a first position where the bumper is separated from the cleaner body by a predetermined distance and a second position where the bumper retreats from the first position, the bumper supporting unit being configured so that the bumper remains in the same horizontal plane as the bumper moves between the first position and the second position, and the bumper supporting unit comprising,
   a pair of flanges formed on opposite sides of the bumper each having a slide hole,
   a pair of connectors each having a pin formed at one end to be inserted into the slide hole, and
   a pair of fixing pieces formed on opposite sides of the cleaner body for fixing the other ends of the connectors at the cleaner body;
   an unexpected obstacle sensing means being switched on/off according to the displacement of the bumper and for detecting a collision with the unexpected obstacle; and
   a controller for controlling the driving part and the suction part, determining the appearance of the unexpected obstacle in response to a signal from the unexpected obstacle sensing means, and changing a running direction of the cleaner body to avoid the unexpected obstacle.

3. The robot cleaner as claimed in claim 1, wherein the unexpected obstacle sensing means comprises a plurality of micro switches disposed at opposite sides of the cleaner body, each micro switch including:
   a switch portion; and
   a plate spring disposed at the cleaner body adjacent to the switch portion for switching on/off the switch portion, the plate spring being elastically biased in normal condition when the bumper is in the first position so as to switch off the switch portion, and the plate spring elastically deformed when the bumper is displaced to the second position so as to switch on the switch portion,
   wherein the controller determines that an unexpected obstacle lies in front of the robot cleaner when the switching portion is switched on.

4. The robot cleaner as claimed in claim 3, wherein the bumper is elastically supported at the first position by the plate spring.

5. The robot cleaner as claimed in claim 3, further comprising a buffering unit for elastically supporting the bumper with respect to the cleaner body to maintain the bumper at the first position and for absorbing the shock to the bumper.

6. The robot cleaner as claimed in claim 5, wherein the buffering unit comprises:
   a first member protruding from an inner side of the bumper toward the cleaner body and having at least one pair of guide recesses positioned opposite each other;
   a second member movably disposed in the first member and having a pair of protrusions formed at one end to be inserted into the guide recesses of the first member, the other end of the second member contacting the cleaner body; and
   an elastic member disposed in the second member for biasing the second member outwardly away from the first member.

7. The robot cleaner as claimed in claim 5, wherein the buffering unit comprises:
   a first supporting member protruding from an inner side of the bumper toward the cleaner body and having at least one pair of guide recesses positioned opposite each other;
   a second supporting member movably disposed in the first supporting member and having a pair of protrusions formed at one end to be inserted in the guide recesses;
   a third supporting member protruding from the other end of the second supporting member and having a hook formed at one end; and a fourth supporting member having a hook hole formed in one side of the cleaner body to receive the third supporting member.

8. The robot cleaner as claimed in claim 7, wherein a fifth supporting member is formed at the other end of the second supporting member and has a front end contacting the fourth supporting member to maintain the third supporting member inserted into the hook hole at a constant position.

* * * * *